US009452800B1

(12) United States Patent
Dixon

(10) Patent No.: US 9,452,800 B1
(45) Date of Patent: Sep. 27, 2016

(54) BICYCLE-MOUNTED PERSONAL HYDRATION SYSTEM

(71) Applicant: Gerald Dixon, Waco, TX (US)

(72) Inventor: Gerald Dixon, Waco, TX (US)

( * ) Notice: Subject to any disclaimer, the term of this patent is extended or adjusted under 35 U.S.C. 154(b) by 13 days.

(21) Appl. No.: 14/338,379

(22) Filed: Jul. 23, 2014

(51) Int. Cl.
*B62J 11/00* (2006.01)
*A45F 3/16* (2006.01)

(52) U.S. Cl.
CPC . *B62J 11/00* (2013.01); *A45F 3/16* (2013.01)

(58) Field of Classification Search
CPC .......... B62J 9/005; B62J 11/00; B62J 99/00; B62J 11/02; B62J 9/001; A45F 3/16; A45F 3/20
USPC ................................................ 224/414, 426
See application file for complete search history.

(56) References Cited

U.S. PATENT DOCUMENTS

| | | | | |
|---|---|---|---|---|
| 3,750,890 A * | 8/1973 | Smith | ............... | A47G 29/08 211/59.1 |
| 4,274,566 A * | 6/1981 | Rowe | ............... | B62J 11/00 222/610 |
| 4,573,595 A * | 3/1986 | Mednis | ............... | B65D 21/0237 206/509 |
| 5,024,358 A * | 6/1991 | Reichert | ............... | B62J 11/00 224/414 |
| 5,215,231 A | 6/1993 | Paczonay | | |
| 5,358,142 A * | 10/1994 | Holmes | ............... | B62J 99/00 222/1 |
| D381,711 S | 7/1997 | Englert | | |
| 5,788,134 A | 8/1998 | Matic | | |
| 6,401,997 B1 | 6/2002 | Smerdon, Jr. | | |
| 2009/0039128 A1* | 2/2009 | Damico | ............... | B60R 9/00 224/572 |
| 2010/0059564 A1* | 3/2010 | Bretl | ............... | A45F 3/16 224/414 |
| 2012/0186656 A1 | 7/2012 | Fitzgerald | | |
| 2012/0193382 A1 | 8/2012 | Wilson | | |
| 2012/0259180 A1 | 10/2012 | Rock | | |

FOREIGN PATENT DOCUMENTS

WO    WO2011017295    6/2011

* cited by examiner

*Primary Examiner* — Adam Waggenspack

(57) ABSTRACT

The bicycle-mounted personal hydration system includes a bladder having a profile that is nested inside of a portion of a bicycle frame so as to not interfere with operation of said bicycle. The bladder includes a first port located on a side surface. The first port enables the bladder to be refilled. The bladder also includes a second port located at a bottommost portion of the bladder. The second port may be in fluid communication with a hose, which travels across the bicycle frame. The hose is further defined with a distal end, which includes a mouthpiece. The mouthpiece is configured to deliver water from the bladder to a bicyclist. The bladder may be made of a flexible material, and include a polygonal shape that is consistent with the opening in a bicycle frame associated with top tube, head tube, and down tube.

7 Claims, 7 Drawing Sheets

BICYCLE-MOUNTED PERSONAL HYDRATION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of personal hydration systems, more specifically, a hydration system that is configured to be mounted into a bicycle frame such that a bicyclist can re-hydrate whilst holding onto the bicycle handlebars.

SUMMARY OF THE INVENTION

An embodiment of the disclosure meets the needs presented above by generally comprising a bladder having a profile that is nested inside of a portion of a bicycle frame so as to not interfere with operation of said bicycle. The bladder includes at least one strap that is configured to secure said bladder to a bicycle frame. The bladder includes a first port located on a side surface. The first port enables the bladder to be refilled. The bladder also includes a second port located at a bottommost communication with a hose, which travels across the bicycle frame. The hose is further defined with a distal end, which includes a mouthpiece. The mouthpiece is configured to deliver water from the bladder to a bicyclist. The bladder may be made of a flexible material, and include a polygonal shape that is consistent with the opening in a bicycle frame associated with top tube, head tube, and down tube. The bladder may include a central opening. Additionally, the bladder may be inserted inside of a protective sleeve that in turn is configured to attach to the bicycle frame directly.

These together with additional objects, features and advantages of the bicycle-mounted personal hydration system will be readily apparent to those of ordinary skill in the art upon reading the following detailed description of presently preferred, but nonetheless illustrative, embodiments of the bicycle-mounted personal hydration system when taken in conjunction with the accompanying drawings.

In this respect, before explaining the current embodiments of the bicycle-mounted personal hydration system in detail, it is to be understood that the bicycle-mounted personal hydration system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bicycle-mounted personal hydration system.

It is therefore important that the claims be regarded as including such equivalent construction insofar as they do not depart from the spirit and scope of the bicycle-mounted personal hydration system. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

Figure 1:
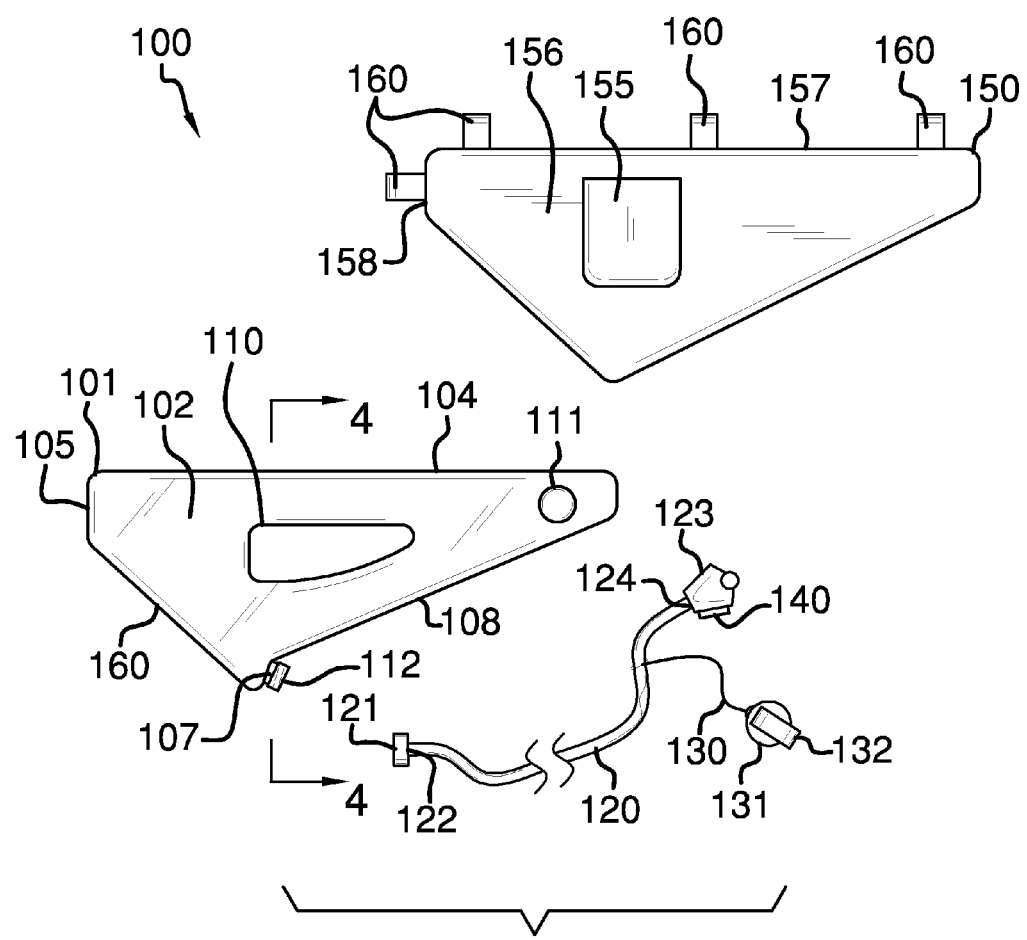
FIG. 1 is a front view of an embodiment of the disclosure.
Figure 2:
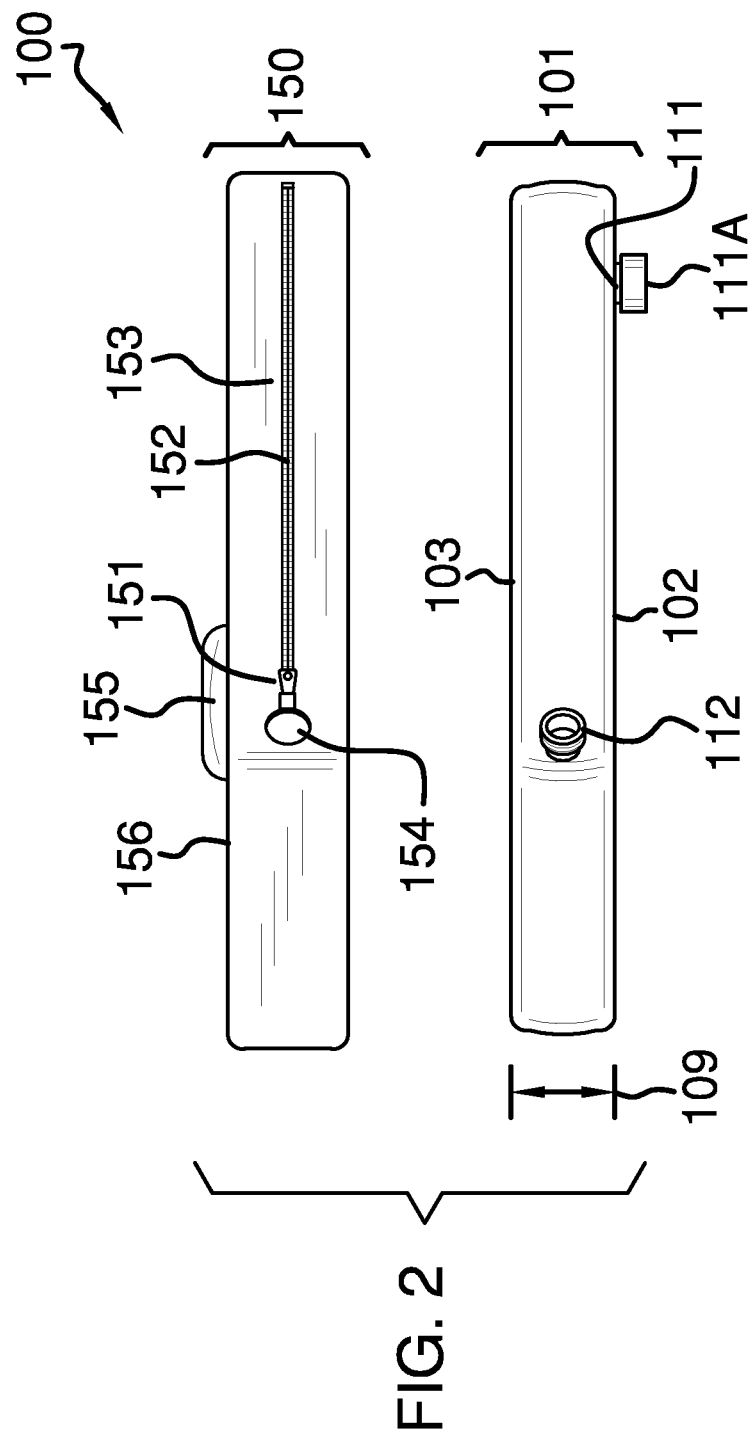
FIG. 2 is a bottom view of an embodiment of the disclosure.
Figure 3:
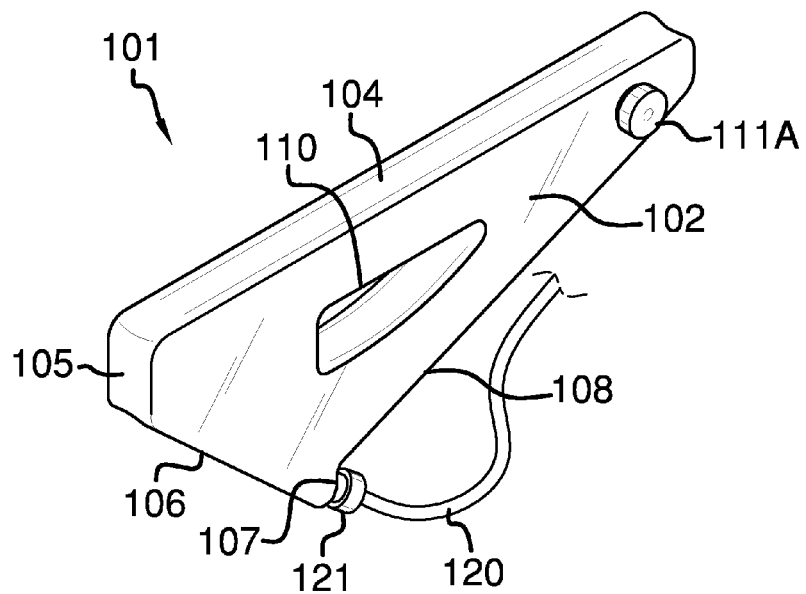
FIG. 3 is a perspective view of an embodiment of the disclosure.
Figure 4:
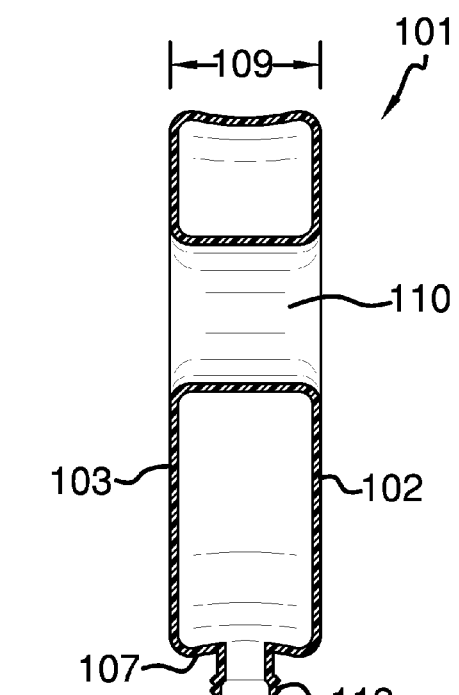
FIG. 4 is a cross-sectional view along line 4-4 in FIG. 1.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 7, the bicycle-mounted personal hydration system 100 (hereinafter invention) generally comprises a bladder 101 that is further defined with a first side 102 and a second side 103. The first side 102 is parallel with and opposite of the second side 103. The bladder 101 is further defined with a top side 104, front side 105, first bottom side 106, second bottom side 107, and third bottom side 108. The bladder 101 is further defined with a bladder width 109, which is not less than ⅛ inch, and not more than 1 foot. The bladder width 109 defines the overall width of the top side 104, the front side 105, the first bottom side 106, the second bottom side 107, and the third bottom side 108. The bladder 101 is a polygonal-shaped object, and which is adapted to be nested inside of a bicycle frame 200.

It shall be noted that the bladder 101 is adapted to be nested inside of the bicycle frame 200. Moreover, the top side 104 is adjacent to a top tube 201 of the bicycle frame 200. The front side 105 is adjacent a head tube 202 of the bicycle frame 200. The first bottom side 106 is adjacent a down tube 203 of the bicycle frame 200.

The bladder 101 may include a central opening 110, which spans across the first side 102 and the second side 103. The first side 102 is further defined with a first port 111. The first port 111 enables the bladder 101 to be refilled with water as needed. The second bottom side 107 includes a second port 112. The second port 112 is located on the second bottom side 107 as the second bottom side 107 is located at a bottommost portion of the bladder 101, and shall enable water to be gravity-fed when exiting the bladder 101.

Figure 7:
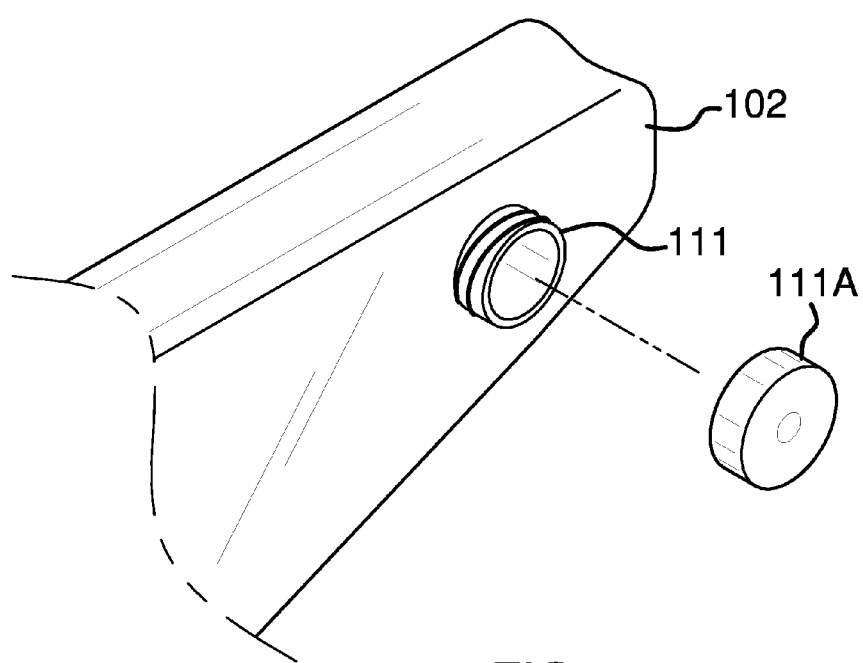
FIG. 7 is a detailed view of the first port of an embodiment of the disclosure.

Referring to FIG. 7, the first port 111 includes a first port cap 111A that is threadably engaged to the first port 111. Moreover, the first port cap 111A enables the first port 111 to be accessed and sealed upon unscrewing or screwing on the first port cap 111A.

Figure 5:
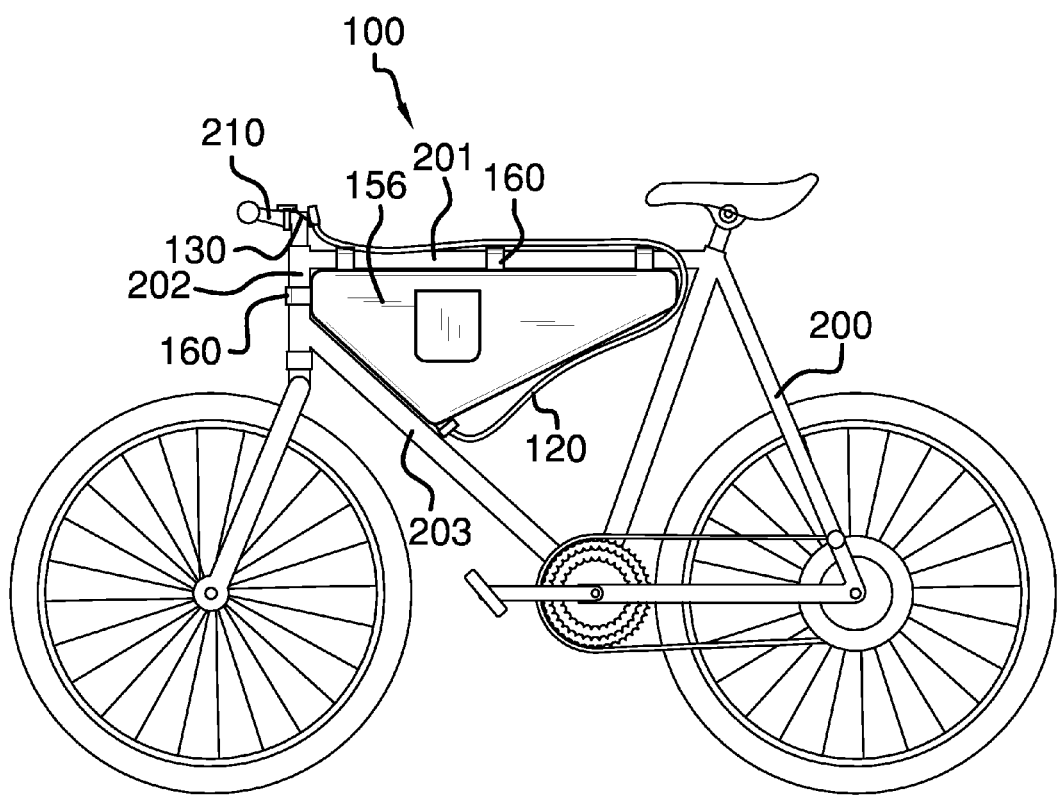
FIG. 5 is a side view of an embodiment in use with a bicycle.
Figure 6:
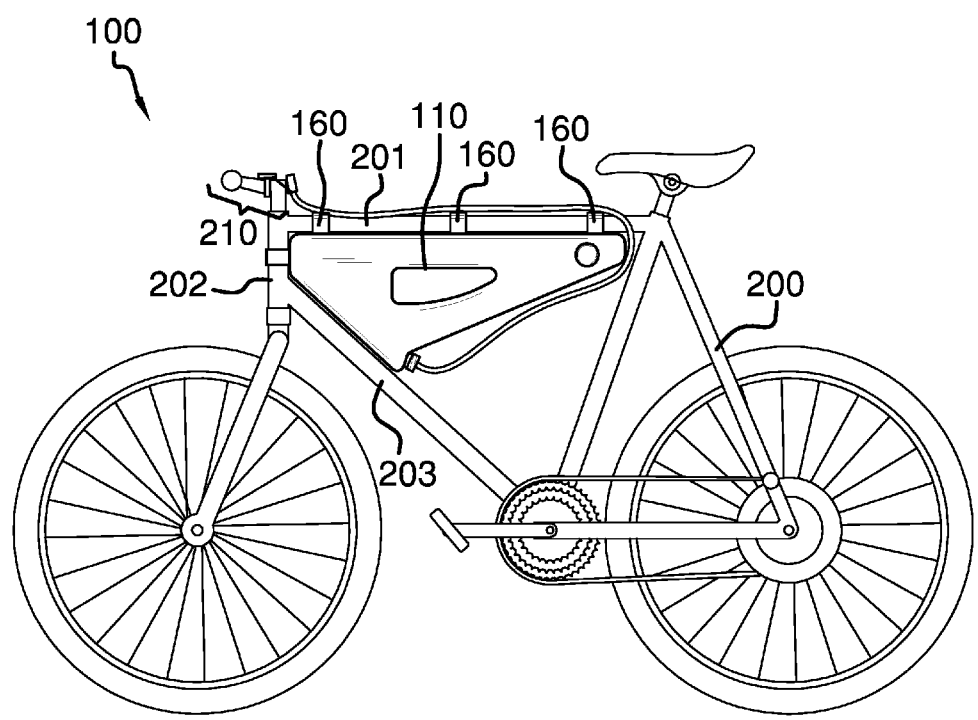
FIG. 6 is a second side view of another embodiment in use with a bicycle.

The second port 112 is able to connect with a hose 120. The hose 120 is of an undefined length, and includes a second port fitting 121 on a first distal end 122. The hose 120 also includes a mouthpiece 123 at a second distal end 124. The second port fitting 121 connects the hose 120 to the second port 112 of the bladder 101. The hose 120 is able to travel along portions of the bicycle frame 200, and over to bicycle handlebars 210. Referring to FIGS. 5 and 6, the hose 120 passes from the second port 112 along the third bottom side 108 of the bladder 101, forwardly along the top tube 201 of the bicycle frame 200, and over to the bicycle handlebars 210.

Figure 8:
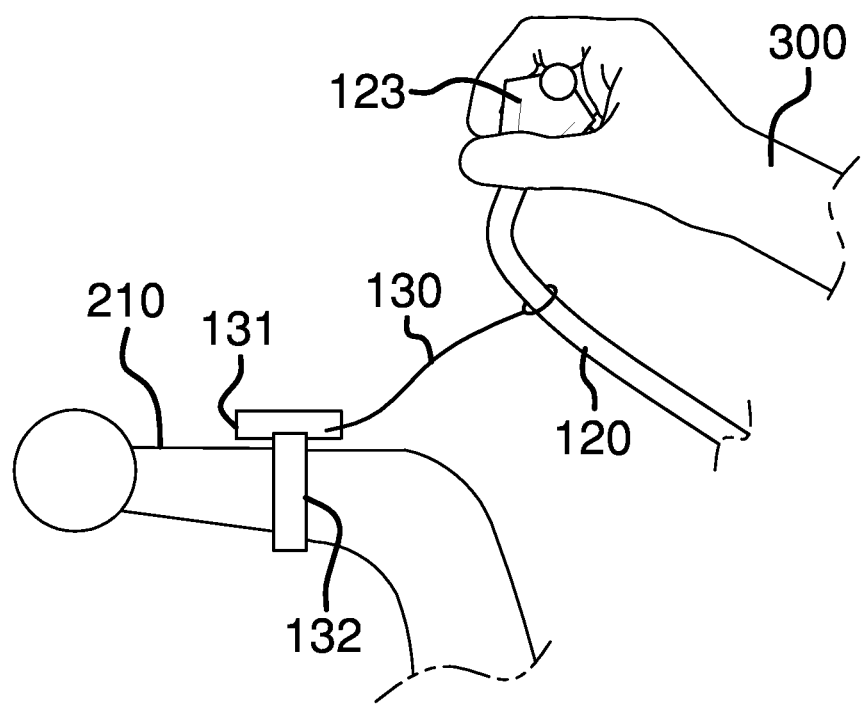
FIG. 8 is another detailed view of the retractable cord of an embodiment of the disclosure.

Referring to FIG. 8, the hose 120 may include a retractable cord 130. The retractable cord 130 includes a spring-loaded spindle base 131 that attaches onto the bicycle handlebars 210, and retracts the retractable cord 130 when not in use. However, an end user 300 is able to pull on the hose 120 in order to utilize the mouthpiece 123, and upon release, the retractable cord 130 retracts into the spring-loaded spindle base 131. It shall be noted that the spring-loaded spindle base 131 may include a cord clip 132 that clips onto the bicycle handlebars 210 or any portion of the bicycle frame 200.

Optionally, the mouthpiece 123 may include a magnet member 140 thereon. The magnet member 140 is responsible for securing the mouthpiece 123 against a surface of the bicycle frame 200. The use of the magnet member 140 may be in lieu of the retractable cord 130.

The invention 100 may include a sleeve 150. The sleeve 150 is specifically designed to enclose the bladder 101. Moreover, the sleeve 150 protects the bladder 101 from damage, puncturing, etc. The sleeve 150 is made of a durable, yet flexible fabric. The bladder 101 may be made of a plastic, or impermeable material, which is flexible, but yet does not leak.

The sleeve 150 includes a zipper 151 on a zippered opening 152. The zippered opening 152 of the sleeve 150 is located on a third sleeve bottom side 153, which is consistent with the third bottom side 108 of the bladder 101. The zippered opening 152 includes a second port hole 154 that corresponds with the second port 112 of the bladder 101. The sleeve 150 may include a storage pouch 155 on a first sleeve side 156.

The sleeve 150 may include at least one strap 160, which is configured to secure the sleeve 150 and the invention 100 to the top tube 201, the head tube 202, or the down tube 203 of the bicycle frame 200. The at least one strap 160 may be located on a top sleeve side 157, or a front sleeve side 158. It shall be noted that at least one strap 160 may be used to secure the bladder 101 directly to the bicycle frame 200, and in such an instance, no sleeve 150 is required.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A bicycle-mounted personal hydration system comprising:
   a bladder that is a polygonal-shaped object configured to be nested inside of a bicycle frame so as not to interfere with use of said bicycle via an end user;
   said bladder connects to a hose having a mouthpiece on a second distal end;
   wherein the bladder is further defined with a first side and a second side; wherein the first side is parallel with and opposite of the second side;
   wherein the bladder is further defined with a top side, front side, first bottom side, second bottom side, and third bottom side;
   wherein the bladder is adapted to be nested inside of the bicycle frame; wherein the top side of the bladder is adapted to be adjacent to a top tube of the bicycle frame;
   wherein the front side is adapted to be adjacent a head tube of the bicycle frame;
   wherein the first bottom side is adapted to be adjacent a down tube of the bicycle frame;
   wherein the first side is further defined with a first port; wherein the first port enables the bladder to be refilled with water as needed;
   wherein the first port includes a first port cap that is threadably engaged to the first port; wherein the first port cap enables the first port to be accessed and sealed upon unscrewing or screwing on the first port cap;
   wherein the second bottom side includes a second port; wherein the second port is located on the second bottom side as the second bottom side is located at a bottommost portion of the bladder, and shall enable water to be gravity-fed when exiting the bladder;
   wherein the second port is able to connect with the hose;
   wherein the hose includes a second port fitting on a first distal end; wherein the second port fitting connects the hose to the second port of the bladder;
   wherein the hose is adapted to travel along portions of the bicycle frame, and over to a set of bicycle handlebars;
   wherein the hose passes from the second port along the third bottom side of the bladder, forwardly along the top tube of the bicycle frame, and over to the set of bicycle handlebars;
   wherein the mouthpiece includes a magnet member thereon;
   wherein the magnet member is responsible for securing the mouthpiece against a surface of the bicycle frame;

wherein the bladder includes a central opening, which spans across the first side and the second side;

wherein the hose includes a retractable cord; wherein the retractable cord includes a spring-loaded spindle base that is adapted to attach onto the bicycle handlebars, and retracts the retractable cord when not in use; wherein the retractable cord connects to the hose; wherein upon release of the hose, the retractable cord retracts into the spring-loaded spindle base.

2. The bicycle-mounted personal hydration system according to claim 1 wherein the bladder is further defined with a bladder width, which is not less than 1/8 inch, and not more than 1 foot; wherein the bladder width defines the overall width of the top side, the front side, the first bottom side, the second bottom side, and the third bottom side.

3. The bicycle-mounted personal hydration system according to claim 1 wherein the spring-loaded spindle base includes a cord clip that is adapted to clip onto the bicycle handlebars or any portion of the bicycle frame.

4. The bicycle-mounted personal hydration system according to claim 1 wherein a sleeve is included, and is specifically designed to enclose the bladder; wherein the sleeve protects the bladder from damage, puncturing, etc.

5. The bicycle-mounted personal hydration system according to claim 4 wherein the sleeve includes a zipper on a zippered opening; wherein the zippered opening of the sleeve is located on a third sleeve bottom side, which is adjacent to the third bottom side of the bladder.

6. The bicycle-mounted personal hydration system according to claim 5 wherein the zippered opening includes a second port hole that corresponds with the second port of the bladder; wherein the sleeve includes a storage pouch on a first sleeve side.

7. The bicycle-mounted personal hydration system according to claim 6 wherein the sleeve includes at least one strap, which is configured to secure the sleeve to the top tube, or the head tube of the bicycle frame; wherein the at least one strap is located on a top sleeve side, or a front sleeve side.

\* \* \* \* \*